United States Patent [19]

Gaus

[11] 4,391,165
[45] Jul. 5, 1983

[54] KICK-DOWN SHIFTING MECHANISM FOR AUTOMATIC CHANGE-SPEED TRANSMISSIONS

[75] Inventor: Hermann Gaus, Stuttgart, Fed. Rep. of Germany

[73] Assignee: Daimler-Benz Aktiengesellschaft, Fed. Rep. of Germany

[21] Appl. No.: 169,521

[22] Filed: Jul. 21, 1980

[30] Foreign Application Priority Data

Jul. 21, 1979 [DE] Fed. Rep. of Germany ....... 2929729

[51] Int. Cl.³ ............................................. B60K 41/10
[52] U.S. Cl. ....................................... 74/869; 74/865; 74/870; 74/877
[58] Field of Search .................. 74/869, 843, 856, 861, 74/862, 865, 868, 870, 877

[56] References Cited

U.S. PATENT DOCUMENTS

| 2,118,978 | 5/1938 | Maybach | 74/870 X |
|---|---|---|---|
| 2,857,780 | 10/1958 | Ball et al. | 74/870 X |
| 2,971,405 | 2/1961 | Flinn | 74/869 X |
| 3,023,632 | 3/1962 | Flinn | 74/869 X |
| 3,080,768 | 3/1963 | Jonia | 74/781 R X |
| 3,117,464 | 1/1964 | Ivey | 74/869 |
| 3,561,293 | 2/1971 | Fujita et al. | 74/869 |
| 3,613,484 | 10/1971 | Pierce et al. | 74/869 |
| 3,667,323 | 6/1972 | Irie | 74/869 X |
| 3,709,064 | 1/1973 | Schaefer et al. | 74/869 X |
| 3,783,713 | 1/1974 | Will | 74/869 X |
| 3,785,224 | 1/1974 | Will | 74/867 X |
| 3,943,799 | 3/1976 | Sakai et al. | 74/869 X |
| 4,020,718 | 5/1977 | Miyauchi et al. | 74/869 |
| 4,134,312 | 1/1979 | Iijima | 74/868 X |
| 4,186,627 | 2/1980 | Kuramochi | 74/869 |

FOREIGN PATENT DOCUMENTS

| 565317 | 10/1958 | Canada | 74/870 |
| 696226 | 9/1940 | Fed. Rep. of Germany | 74/870 |

Primary Examiner—Rodney H. Bonck
Attorney, Agent, or Firm—Craig & Burns

[57] ABSTRACT

A kick-down circuit for automatic change-speed transmissions, with a kick-down control member transmitting a kick-down control signal when an accelerator pedal is "floored" and with at least one gearshift valve for the operating pressure of a shift-actuating member participating in a shifting-over between a higher gear and a lower gear. The gearshift valve is actuatable by a control pressure dependent upon a driving speed along the lines of an "upshifting" and by a control pressure dependent upon a position of the gas pedal along of the lines of a "downshifting." Upon the occurrence of the kick-down control signal, under elevation of the control pressure dependent upon the position of the accelerator pedal, the gearshift valve may be brought into a position for the lower gear. The elevation of the control pressure acting along the lines of the "downshifting" triggered by the kick-down control signal is temporally limited independently of a position of the accelerator pedal.

8 Claims, 3 Drawing Figures

KICK-DOWN SHIFTING MECHANISM FOR AUTOMATIC CHANGE-SPEED TRANSMISSIONS

The present invention relates to an automatic transmission and, more particularly, to a kick-down circuit for an automatic change-speed transmission.

In, for example, U.S. Pat. No. 3,080,768, a kick-down circuit for an automatic change-speed transmission is proposed which includes a kick-down control member for transmitting a kick-down control signal when a gas pedal or accelerator of a vehicle is "floored", and at least one gearshift control element operating in dependence upon an output speed of the transmission and a position of the accelerator for an auxiliary operating force of a shifting-over between a higher gear and a lower gear. A gearshift control element or valve is activatable by a control pressure dependent on the driving speed along the lines of an "upshifting" and by a control pressure dependent on the position of the gas pedal or accelerator along the lines of a "downshifting." Upon an occurrence of the kick-down control signal under an elevation of the control pressure dependent upon the position of the gas pedal or accelerator, the gearshift control element may be brought into a position for a lower gear.

In the above-noted proposed construction, the control pressure applied to the gearshift valve, along the lines of a "downshifting" is reduced proportionately over a normal pedal distance between idling and full load positions of the gas pedal or accelerator by means of a pressure-reducing valve, with respect to the control pressure dependent upon the position of the gas pedal or accelerator. The kick-down control valve is connected, by means of a bypass control pressure line, circumventing the pressure-reducing valve, to the gearshift valve to which the control valve, in a kick-off position, applies the full control pressure dependent upon the position of the gas pedal or accelerator.

A disadvantage of the aforementioned proposed construction resides in the fact that there is a delay in the enforcing or initiation of the downshifting following the kick-down signal. This delay effect takes place at driving speeds which are near the limit speed at which downshifting operations are just barely still possible. The cause of this delay is that an oil pressure dependent upon a driving speed and an oil pressure dependent upon a position of the gas pedal act against each other on an end face of a gearshift valve. Near to a limit of the downshifting speed, excess forces at the gearshift valve or gearshifting element, in a direction toward downshifting, become very small so that the valve body of the gearshift valve or gearshifting element moves correspondingly slowly such that a driver of the vehicle may sense as a delay the time interval from operation of the kick-down switch to an opening of control edges of the gearshift valve at the beginning of the downshifting operation.

The aim underlying the present invention essentially resides in providing a kick-down circuit for an automatic change-speed transmission which avoids a delay in downshifting operations following an operation of a kick-down switch or the emitting of a kick-down signal.

In accordance with advantageous features of the present invention, an elevation of the control pressure which acts along the lines of a "downshifting", which elevation is triggered by the kick-down control signal is temporally limited independently of a position of the gas pedal or accelerator of the vehicle.

While, in a conventional kick-down circuit for an automatic change-speed transmission, the control pressure increased by the kick-down switch can, at most, be equal to the pressure transmitted by the control valve for the control pressure dependent upon the gas pedal, in accordance with advantageous features of the kick-down circuit of the present invention, the control pressure is higher than the feed pressure normally ambient at the control valve.

More particularly, in accordance with the present invention, a pressure control valve setting the control pressure dependent upon the position of the gas pedal is provided with the pressure control valve, upon the gas pedal or accelerator being "floored", releasing a substantially unthrottled connection between its valve connections for the control pressure dependent upon the position of the accelerator and for a feed pressure line. A further pressure control valve sets a constant feed pressure in the feed pressure line, with the further pressure control valve being brought, upon an occurrence of the kick-down control signal, into a position for a feed pressure which is increased as compared to the constant feed pressure.

With the kick-down circuit of the present invention, the oil pressure acting on the gearshifting valve or gearshifting element in a downshifting direction is increased only for a brief, predetermined time period $t_o$. If an excess force at the gearshift valve is so large that the control edges are opened during this time period $t_o$, then a downshifting occurs. If the excess force is too small, the valve body of the gearshift valve, after an elapse of the predetermined time period $t_o$, returns into a starting position due to the oil pressure which has now been once again lowered and, consequently, a downshifting does not take place.

Advantageously, the time period $t_o$ of pressure elevation is so selected that it is just short of being perceived by the driver of the motor vehicle as a delay.

In accordance with still further features of the present invention, a timing member is arranged in a kick-down pressure control line leading to the pressure control valve for the feed pressure.

Additionally, in accordance with the present invention, a pre-control valve is brought, in order to cut off the control pressure, dependent upon a position of the gas pedal or accelerator, from the gearshift valve or gearshifting element in the higher gear, upon the occurrence of the kick-down control signal, in a position wherein the control pressure dependent upon the position of the gas pedal or accelerator is made to act on the gearshift valve or gearshifting element.

Accordingly, it is an object of the present invention to provide a kick-down circuit for an automatic change-speed transmission which avoids, by simple means, the shortcomings and disadvantages encountered in the prior art.

Another object of the present invention resides in providing a kick-down circuit for automatic change-speed transmissions which extensively avoids any delaying in a downshifting operation.

Yet another object of the present invention is providing a kick-down circuit for an automatic change-speed transmission which enables the generating of a control pressure which is higher than a feed pressure normally ambient at a control valve in the kick-down circuit.

A further object of the present invention resides in providing a kick-down circuit for automatic change-speed transmissions which insures that a downshifting does not take place until an excess force prevails at a gearshifting element for a predetermined period of time.

A still further object of the present invention resides in providing a kick-down circuit for automatic change-speed transmissions which functions reliably under all operating conditions.

A further object of the present invention resides in providing a kick-down circuit for automatic change-speed transmissions which is simple in construction and therefore relatively inexpensive to manufacture.

These and other objects, features, and advantages of the present invention will become more apparent from the following description when taken in connection with the accompanying drawings which show, for purposes of illustration only, one embodiment in accordance with the present invention, and wherein.

Figure 1:
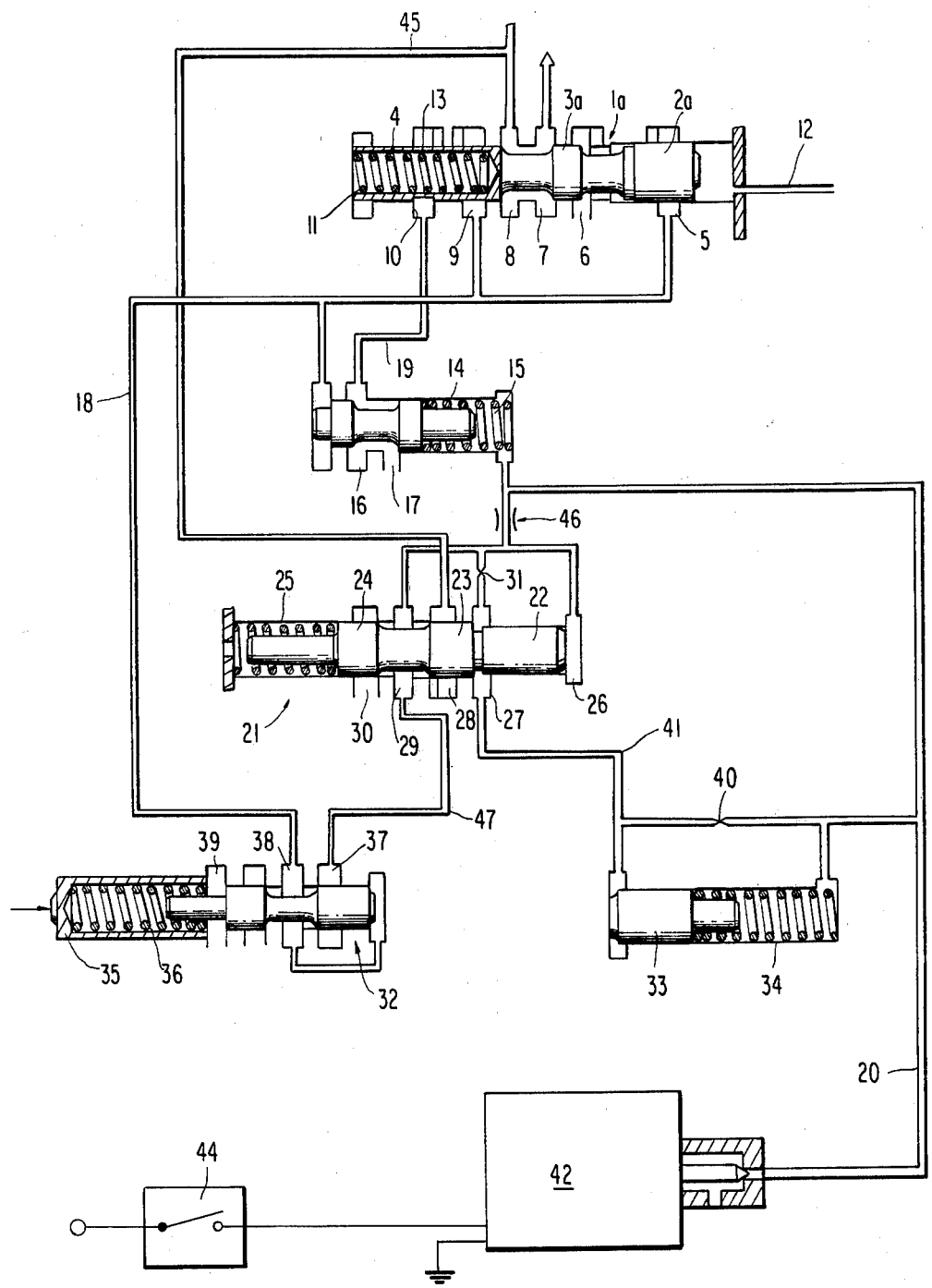
FIG. 1 is a schematic switching diagram of a kick-down circuit in accordance with the present invention.

Referring now to the drawings wherein like reference numerals are used throughout the various views to designate like parts and, more particularly, to FIG. 1, according to this figure, a gearshift valve generally designated by the reference numeral 1a is provided with control collars 2a, 3a and 4, as well as control recesses 5, 6, 7, 8, 9, and 10, and a compression spring 11. The control collar 2a is larger in diameter than the control collars 3a and 4. In FIG. 1, the gearshift valve 1a is illustrated in the "upshifted" position. The control pressure of a control pressure line 12, dependent upon a driving speed of the vehicle in which the change-speed transmission is disposed, acts on a right-hand end face of the valve 1a. The control recesses 5, 9 are connected to a control pressure line 18 under a control pressure dependent upon a position of a gas pedal or accelerator (not shown), whereas the recess 8 is in communication with a main line 45 under an operating pressure. The recess 7 is in communication with a shift-actuating member (not shown) to be acted upon and the recess 6 is in communication with an oil sump (not shown).

The left-hand end face of the control valve 1a forms a spring side thereof and is connected through a transverse bore 13 and through a control recess 10 to a control recess 16 of a precontrol valve generally designated by reference numeral 14 through a connecting line or conduit 19. The precontrol valve 14 is provided with a compression spring 15 and a further control recess 17.

A left-hand end face of the precontrol valve 14 is connected to the control pressure line 18, which is under the control pressure dependent upon a position of the accelerator or gas pedal; whereas, a right-hand end face of the precontrol valve 14 is acted upon by the compression spring 15 and is connected through a kick-down control pressure line 20 to a conventional kick-down solenoid valve 42.

In a left-hand shifting position, the recess 16 is relieved through the recess 17 to the oil sump; whereas, in the right-hand shifting position, the recess 16 is connected with the control pressure line 18. A control valve, generally designated by the reference numeral 21 is provided with control collars 22, 23, 24, a compression spring 25, and control recesses 26, 27, 28, 29, and 30. The control valve 21 acts as a pressure-reducing valve, and the recess 28 is connected to the main line 45, with the recess 30 being connected with the oil sump.

The pressure, regulated so as to be at a constant value, is transmitted through the recess 29 to a pressure control valve generally designated by the refernece numeral 32 for the control pressure dependent upon a position of the gas pedal or accelerator, to the recess 26 at a right-hand end face side of the control valve 21, through a throttle 31 to the recess 27, and through a further throttle 46 to the kick-down control pressure line 20. Oil pressure acting on the right-hand end face of the control valve 21 cooperates with the oil pressure effective on the differential surface area of the control collars 23 and 22, with both pressure acting against the compression spring 25.

A timing means is provided in the form of a valve 33 acted upon by a compression spring 34, with the valve 33 being effective as a pressure reservoir. A spring chamber of the valve 33, in which the spring 34 is accommodated is in communication with the kick-down control pressure line 20. The left-hand side of the plunger or piston of the valve 33 is in communication, on the one hand, with the control recess 27 of the control valve 21 by way of a line 41 and, on the other hand, with the control pressure line 20 by way of a throttle 40.

The control valve 32 for the control pressure dependent upon the position of the gas pedal or accelerator includes a piston or plunger 35 and a compression spring 36. Depending on a position of the gas pedal or accelerator, the compression spring 36 is more or less pretensioned by a shifting of the piston or plunger 35, and an oil pressure proportional to the spring force is regulated in a control recess 38 of the control valve 32.

During a full throttle and kick-down, the control recess 38 is connected to or is in communication with the control recess 37 which, in turn, is in communication, through feed pressure line 47, with recess 29 of the control valve 21, so that the pressure regulated by the control valve 21 and recess 29 is applied in the control pressure line 18.

The kick-down solenoid valve 42 is operated in a conventional manner through an electric switch 44 so as to relieve the line 20. The kick-down solenoid valve 42 could also be replaced by a mechanically operated valve.

In case of a kick-down operation of the change-speed transmission, the kick-down solenoid valve 42 is activated by a closing of the electric circuit so that the control pressure line 20 is regulated so as to be without pressure. As a result of this, the precontrol valve 14 enters its right-hand end position and connects the left-hand end face of the gearshift valve 1a with the oil pressure of the control pressure line 18 controlled by the control valve 21. At the same time, the spring chamber accommodating the compression spring 34 of the valve 33 is relieved, and the plunger of the valve 33 begins shifting toward the right. As a consequence of this, during the movement of the plunger of the valve 33, a reduced oil pressure is ambient in the line 41 and thus in the recess 27 of the control valve 21. The level of the pressure ambient in the line 41 corresponds to the spring force of the compression spring 34 based on the surface area of the plunger of the valve 33.

The reduced oil pressure ambient in the line 41 acts on the differential surface area between the collars 23 and 22 of the control valve 21. In order to balance the compression spring 25, it is thus necessary to increase the regulating oil pressure acting in the recess 26 on the right-hand end face of the control valve 21. By way of the control valve 32, precontrol valve 14 and/or control pressure line 18, this increased pressure acts on the left-hand end face of the gearshift valve 1a and tends to shift the valve body of the gearshift valve 1a toward the right. As soon as the valve 33 has arrived at its right-hand abutment position, the pressure in the line 41 is again on the increase and/or the pressure elevation of the control valve 21 in the control pressure line 18 is cancelled.

During the operating time of the valve 33, the force effective at the gearshift valve 1a on the left-hand end face against the oil pressure dependent upon the driving speed of the vehicle is thus increased. If, during this time period $t_o$, the duration of which is chosen so that it is below the limit of perception by the driver of the vehicle, the gearshift valve 1a is moved so far that the control collar 2a opens the control recess 5, and the control collar 3a closes the recess 6, then the valve body of the gearshift valve 1a is moved completely toward the right into a downshifting position by the oil pressure of the control pressure line 18 which is now also acting on the differential surface area between the collars 2a and 3a of the gearshift valve 1a. If the time period $t_o$ is insufficient for an opening and closing, respectively, of the two control recesses 5, 6, then the valve body of the gearshift valve 1a returns to the left-hand starting position, and a downshifting operation is not carried. Consequently, a zone or area of delayed downshifting operations is eliminated.

Figure 2:
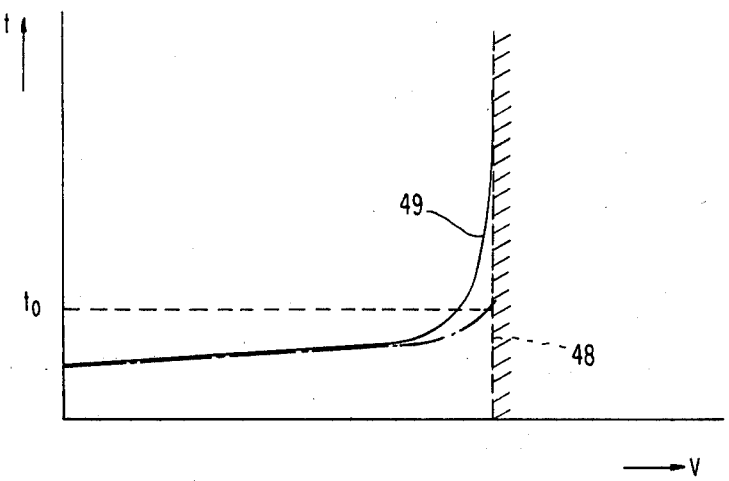
FIG. 2 is a graphical illustration of a switching-over time of a gearshift valve of the kick-down circuit of FIG. 1, plotted over the driving speed.

FIG. 2 shows more clearly how, due to the pressure-raising step of the present invention, the switchover time t of the gearshift valve 1a is reduced to the value $t_o$ in proximity of a limit value 48 of a driving speed v up to which downshifting operations are possible. In the diagrammatic illustration of FIG. 2, the curve 49 represents a switchover time without a raising of the control pressure.

Figure 3:
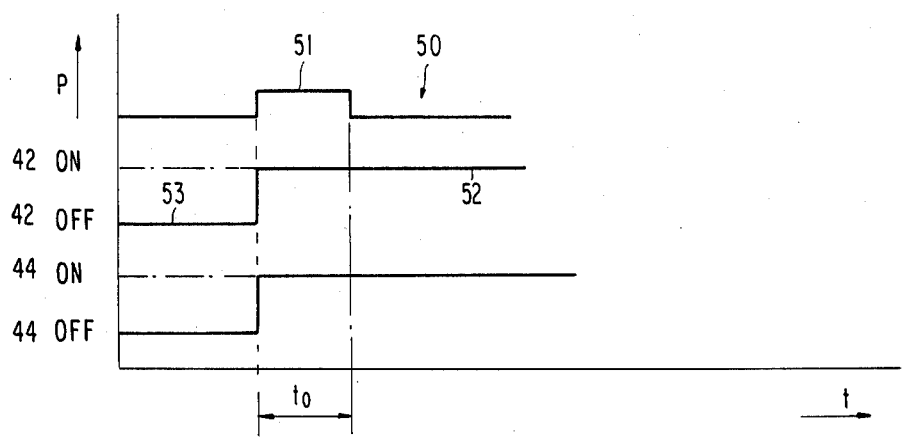
FIG. 3 is a diagrammatic illustration of a pressure of a control pressure line in accordance with positions of a kick-down control valve and kick-down switch of the kick-down circuit of FIG. 1, plotted over time.

As shown in FIG. 3, a constant pressure 50 in the feed pressure line 47 is increased to a pressure 51 during the effective duration of the time period $t_o$ of the pressure-raising step. The diagrammatic illustration of FIG. 3 illustrates the on and off positions of the kick-down solenoid valve 42, with the reference numerals 52 and 53 and those of the kick-down switch 44 with the reference numerals 54 and 55. The reference character $t_o$ represents the operating time of the plunger of the valve 33.

While I have shown and described only one embodiment in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A kick-down circuit for an automatic change-speed transmission, the circuit including a kick-down control means for transmitting a kick-down control signal when an accelerator pedal of a vehicle in which the transmission is installed is displaced to a predetermined position, at least one gearshift valve means including a valve body for controlling an operating pressure of a shift-actuating means which participates in a shifting between a higher gear and a lower gear, means for setting a control pressure acting upon the valve body is dependence upon a driving speed of the vehicle for shifting from a lower gear to a higher gear, and means for setting a control pressure acting upon the valve body in dependence upon a positioning of the accelerator pedal for shifting from a higher gear to a lower gear, characterized in that means are provided for elevating the control pressure dependent upon the position of the accelerator upon the occurrence of a kick-down signal, and in that means are operatively connected with the control pressure elevating means for limiting a duration of the elevated control pressure acting upon the valve body independently of the position of the accelerator pedal.

2. A kick-down circuit according to claim 1, characterized in that the means for setting a control pressure acting upon the valve body in dependence upon the position of the accelerator pedal includes a first pressure control valve, said means for setting the control pressure in dependence upon the positioning of the accelerator pedal includes a second pressure control valve for setting a constant feed pressure in a feed pressure line disposed between the first pressure control valve and the second pressure control valve, a control pressure line is disposed between the gearshift valve means and the first pressure control valve for enabling the control pressure dependent upon the position of accelerator to act upon the valve body, the first pressure control valve is operable, upon the accelerator pedal being displaced to a predetermined position, to release a substantially unthrottled connection between valve connections thereof for the control pressure dependent upon a position of the accelerator pedal and for the feed pressure line, and in that the second control valve is operable upon the occurrence of a kick-down control signal to be displaced into a position for elevating the control pressure above the constant feed pressure.

3. A kick-down circuit according to one of claims 1 or 2, characterized in that the means for limiting a duration of the elevated control pressure includes a timing means arranged in a kick-down pressure control line leading to said second pressure control valve.

4. A kick-down circuit according to claim 3, characterized in that said timing means is a control valve.

5. A kick-down circuit according to claim 4, characterized in that a precontrol valve means is provided for controlling the control pressure dependent upon a positioning of the accelerator pedal, the precontrol valve is operable to be displaced to a position wherein the control pressure dependent upon the accelerator pedal is made to act upon the valve body in order to cut off the control pressure dependent upon the position of the accelertor pedal from the gearshift valve means in the higher gear.

6. A kick-down circuit according to one of claims 1 or 2, characterized in that the means for limiting a duration of the elevated control pressure includes a timing means arranged in a kick-down pressure control line.

7. A kick-down circuit for an automatic change-speed transmission, the circuit comprising a kick-down control means for transmitting a kick-down control signal when an accelerator pedal of a vehicle in which the transmission is installed is displaced to a predetermined position, at least one gearshift valve means including a valve body for controlling an operating pressure of a shift-actuating means which participates in a shifting between a higher gear and a lower gear, means for setting a control pressure acting upon the valve body in dependence upon a driving speed of the vehicle for shifting from a lower gear to a higher gear, means for setting a control pressure acting upon the valve body in dependence upon a positioning of the accelerator pedal for shifting from a higher gear to a lower gear, means for avoiding delay in downshifting operations following transmission of a kick-down signal comprising means for elevating the control pressure dependent upon the position of the accelerator upon the occurrence of a kick-down signal and means operatively connected with the control pressure elevating means for limiting a duration, $t_o$, of the elevated control pressure acting upon the valve body independently of the position of the accelerator pedal.

8. A kick-down circuit as set forth in claim 7 wherein $t_o$ is so short as not to be perceptible to a driver.

* * * * *